Figure 1:
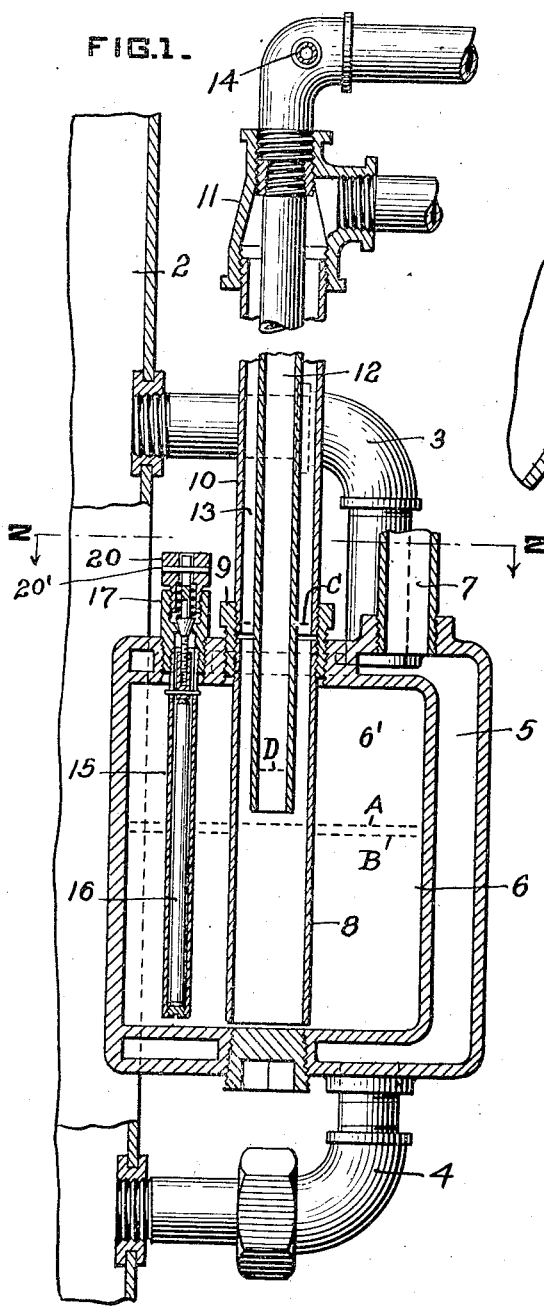

R. T. PARISEN.
CONTROLLING THE FLOW OF GAS FOR HEATING WATER.
APPLICATION FILED SEPT. 21, 1916.

1,330,215. Patented Feb. 10, 1920.

WITNESSES
J. Herbert Bradley.
E. B. Molter.

INVENTOR
R. T. Parisen,
By J. W. Herbit
Atty.

UNITED STATES PATENT OFFICE.

ROBERT T. PARISEN, OF PITTSBURGH, PENNSYLVANIA, ASSIGNOR TO LAWSON MANUFACTURING COMPANY, OF PITTSBURGH, PENNSYLVANIA, A CORPORATION OF PENNSYLVANIA.

CONTROLLING THE FLOW OF GAS FOR HEATING WATER.

1,330,215.   Specification of Letters Patent.   Patented Feb. 10, 1920.

Application filed September 21, 1916. Serial No. 121,483.

*To all whom it may concern:*

Be it known that I, ROBERT T. PARISEN, a citizen of the United States, and resident of Pittsburgh, in the county of Allegheny and State of Pennsylvania, have invented certain new and useful Improvements in Controlling the Flow of Gas for Heating Water, as set forth in the annexed specification.

This invention relates to utilizing the temperature of the water being heated for controlling the flow of gas for heating the same, and involves the employment of movable means for controlling the gas flow, such means being utilized in connection with force producing means that is automatically controlled by the temperature of the water. The force producing means may be variously embodied; also various means may be employed for transmitting the force and making it effective in controlling the flow of fuel gas. In the preferred practice, the gas flow is varied or shut off altogether by varying the level of a body of liquid, and such level variations are produced by a force that is under thermostatic control of the water. Air or other gaseous medium confined above such liquid constitutes a convenient and efficient force producer as it is readily susceptible to variations in temperature of the water, the resulting variations in volume of the gaseous medium acting to vary the level of the liquid. The invention however contemplates any force producer that is under the automatic control of the water being heated and which creates the necessary variations in the liquid level. While the force creating and force transmitting agencies above referred to are preferably used in conjunction with each other, it will be understood that the invention contemplates the employment of either of those agencies in connection with any other agency that will render the same effective for automatically controlling the flow of gas for heating water.

In that feature of the invention which utilizes the expansive force of a gaseous medium for controlling the gas flow, communication between such medium and the atmosphere is thermostatically controlled, and such control is preferably adjustable in order that such communication may be shut off at varying temperatures, thereby varying the time when the confined medium begins to expand and hence begins to affect the gas flow. It is characteristic of this feature of the invention that normally, or at least in the first stages of the water-heating operation, the gaseous medium is in communication with the atmosphere and so remains until that temperature has been attained at which it is desired to start the production of the gas-controlling force. If water of relatively high temperature is desired, the adjustment is such that the thermostat becomes effective and closes communication with the atmosphere only after the water has been heated to a considerable amount. On the other hand, if a relatively low water temperature is desired, the adjustment is such that the thermostat acts more promptly, thereby closing communication with the atmosphere and hence confining the gaseous medium at an earlier stage in the operation and causing the expansion thereof to more promptly react on the gas flow.

The invention is preferably embodied in apparatus wherein liquid of changing level under the influence of a varying volume of air or other gaseous medium operates to produce a seal for varying or for stopping the flow of gas, thereby dispensing with mechanical valves and other mechanical appliances affecting such control.

Figure 2:
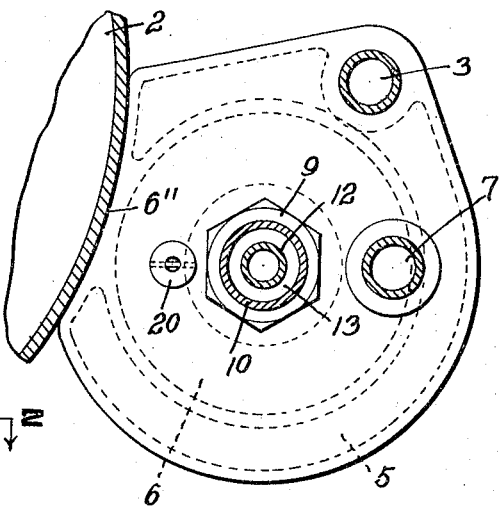
Figure 3:
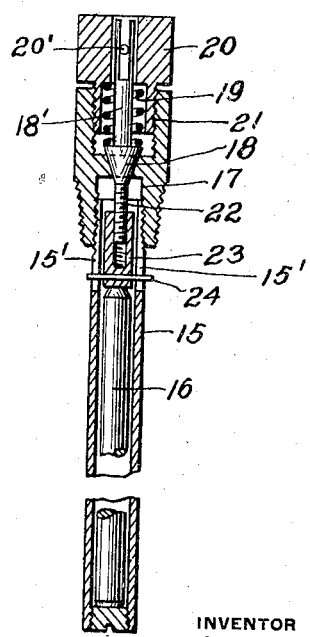

In the accompanying drawings, Figure 1 is a sectional elevation of a desirable form of apparatus for practising the invention. Fig. 2 is a view in top plan of the water jacketed chamber of the improved apparatus taken on line 2—2 of Fig. 1. Fig. 3 is a detail of the thermostatic valve for controlling communication with the atmosphere.

Referring to the drawings, 2 designates a portion of a boiler or other water container to which the circulating pipes 3 and 4 are connected at different elevations, pipe 3 preferably leading to the top of hollow wall 5 of chamber 6, and with circulation pipe 4 communicating with the lower portion of the water jacket. While the apparatus may be variously assembled, an outer face of chamber 6 is preferably of concave form as shown at 6″ to fit against the wall of boiler 2, and with the apparatus arranged as here shown circulation connections 3 and 4 serve to support chamber 6. The preferable means for admitting cold water to the boiler is through a pipe 7 which discharges downwardly in water jacket 5 and through the latter and through connection 4 into the lower portion of the boiler. Circulation of water through the water jacket is thus stimulated in addition to its natural tendency to circulate between the boiler and the jacket chamber.

Within chamber 6 is confined a predetermined amount of liquid, a non-evaporating oil being preferably used. Extending downwardly into the chamber through its top and nearly to the bottom thereof is a dip pipe 8 which may be secured in the bushing 9, in which bushing is also secured the lower end of pipe 10 which is, in effect, an upward continuation of pipe 8 and which constitutes a passageway for conducting gas through a fitting 11 that is suitably connected to gas burning means for heating the water in boiler 2. The gas burning means and the mechanism whereby the gas-produced heat is transmitted to the water are not illustrated, as any of various forms of apparatus well known in the art may be utilized.

The gas supply pipe 12 extends downwardly through pipe 10, being spaced therefrom sufficiently to provide a passageway 13 between the pipes and of ample area for the gas flowing to the burners. Pipe 12 extends downwardly into dip pipe 8, its lower extremity terminating slightly above the level of the liquid in chamber 6 when the liquid is cool or cold, the approximate level at such time within chamber 6 and the dip pipe being indicated by line A. In the upper portion 6' of chamber 6 is air or other gaseous medium which is adapted to expand and contract under the influence of the changing temperatures emanating from the water jacket of chamber 6, also from boiler 2 when the apparatus is fitted thereagainst as here shown. Air is preferably utilized, although the invention is not limited thereto.

In operation, when the water is cool or cold the air or other gas within space 6' is fully contracted and the fluid in the chamber as well as in dip pipe 8 is substantially at level A, and the lower end of a gas inlet pipe 12 is fully open for the discharge of gas into passageway 13 formed by tube 10. The rising temperature of the water resulting from heat derived from the gas thus admitted to the heating apparatus heats chamber 6 through the circulation of the water through the water jacket, and the consequent increase in the temperature of the air or other gaseous medium in space 6' expands the same, thereby depressing the liquid level to approximately line B, and similarly raising the level in the dip pipe and in the lower end of gas supply pipe 12 to approximately lines C and D, respectively, the lower level in pipe 12 resulting from the head or pressure of gas in said pipe, whereas in space 13 substantially atmospheric pressure exists, any slight back pressure produced by the contracted burner outlets being negligible. When the liquid has attained the approximate levels indicated by lines B, C and D, the liquid head within the lower portion of gas supply pipe 12 equals or slightly exceeds the gas pressure and the flow is shut off altogether. Between the extreme levels, i. e., while the liquid is being depressed from level A to level B, the open extremity of pipe 12 becomes submerged and the gas flow is diminished, although the gas continues to discharge through the liquid and bubbles upwardly into space 13 until the liquid head entirely predominates. The supply of gas for heating the water is thus automatically regulated to the exact amount for heating the water to a desired maximum. Obviously, as the water cools there is corresponding cooling and contraction of the gaseous medium in space 6' which permits the liquid to recede to or toward its normal level, thereby automatically restoring and increasing the flow of gas. Gas for supplying a pilot burner may be tapped off from pipe 12, for instance at point 14, for lighting the burners after the flow has been restored, this being a familiar expedient in water heating apparatus.

The maximum temperature of the water is subject to automatic regulation through the medium of a thermostatic valve which controls communication between space 6' and the atmosphere. In addition, this expedient serves to maintain the required volume of air within said space, compensating for loss that may in time result from leakage, and for changes in density due to absorption of the oil or the fuel gas. As here embodied the thermostatic control consists of a tube 15 of copper or other material having the requisite co-efficients of expansion and contraction, the tube being secured in and depending from the top wall of chamber 6 and inclosing a neutral rod 16. Above the tube and rod is valve casing 17 in which is seated the upwardly opening needle valve 18. The valve is held normally seated by spring 19 which is confined in engagement therewith by cap 20, the latter having a threaded adjustment 21 in valve casing 17. The slotted valve stem 18' is non-rotatably secured to the cap by pin 20'. Depending from the valve is the threaded stem 22 which is entered in a threaded socket in head 23, the latter movable vertically in the upper end of tube 15 and engaging the upper extremity of neutral rod 16. Head 23 is prevented from rotating by pin 24 which is slidable in slots 15' cut in the upper portion of tube 15. These slots also serve to establish communication between air space 6' and the seat of valve 18.

At the beginning of the water heating operation the relatively low temperature of the water, of chamber 6, and of the fluid contents of the chamber maintains the thermostatic tube 15 contracted and needle valve 18 open, so that the gaseous fluid space 6' in the upper portion of chamber 6 is in communication with the atmosphere. For heating water to a relatively high temperature cap 20 is retracted, thereby elongating the connection between the valve and the neutral element, with corresponding increase in the opening of the valve when the thermostat is contracted, and and hence requiring a higher heat to sufficiently expand tube 15 to permit the valve to close. While the valve is thus open the full amount of gas passes out of pipe 12 and to the burners and the water circulating through the water jacket is heated to a considerable degree before a temperature sufficient to expand tube 15 to such an extent as to permit the valve to close has been attained. With the valve thus open the gaseous medium in chamber 6 is free to expand under the rising temperature without affecting the level of the liquid. But when the valve closes the ensuing expansion of the gaseous fluid changes the relative levels with relation to the dip pipe and to the gas supply pipe as above described, first diminishing the flow of gas and finally shutting it off altogether. For heating water to a relatively low temperature cap 20 is advanced or set up, thereby shortening the connection between the neutral element and the valve and permitting the valve to close with less expansion of tube 15 and hence at a lower temperature than in the operation first described. This results in more promptly confining the gaseous medium in space 6' and hence rendering it more quickly effective for changing the liquid levels and checking the gas flow. The gaseous content of chamber 6 is thus always so maintained as to cause the water to be heated to the desired temperature. Also with the upper portion of chamber 6 in free communication with the atmosphere, variations in the density of the gaseous fluid resulting from absorption of oil or fuel gas are neutralized by reason of the free communication with the atmosphere, and hence the density of the gaseous contents of chamber 6 is always approximately the same as the atmosphere.

While the invention is described in connection with the heating of water, it is of course available for heating other fluids.

I claim:

1. In a water heater, the combination of a container for a gaseous medium with the container in communication with the atmosphere when the water being heated is below a predetermined temperature, means made operative by temperature of the water higher than such predetermined temperature for closing communication with the atmosphere, a fuel gas conduit, and means made operative by expansion of the gaseous medium after communication with the atmosphere has been closed for controlling the flow of gas through said conduit.

2. In a water heater, the combination of a liquid container, a fuel gas conduit, means controlled by variations of liquid level within the container for varying the flow of gas through the conduit, the space within the container above the liquid adapted to communicate with the atmosphere when the water being heated is below a predetermined temperature, and means made operative by temperature of the water higher than such predetermined temperature for closing communication with the atmosphere.

3. In a water heater, the combination of a liquid container, a fuel gas conduit, means controlled by variations of liquid level within the container for varying the flow of gas through the conduit, the container confining a gaseous fluid above the liquid, means for subjecting the confined gaseous medium to variations in the temperature of the water, a valve for controlling communication between the gas space of the container and the atmosphere, and temperature controlled means for actuating said valve.

4. In a water heater, the combination of a liquid container, a fuel gas conduit, means controlled by variations of liquid level within the container for varying the flow of gas through the conduit, the container confining a gaseous medium above the liquid with such medium subjected to variations in the temperature of the water, a valve for controlling communication between the gas space of the container and the atmosphere, and a thermostat within the container and operatively connected to said valve for controlling the movement thereof.

5. In combination with a water heater; a chamber containing liquid and a gaseous fluid, a fuel supply line adapted to be opened and closed by the varying height of said liquid, the height of said liquid being controlled by the quantity and temperature of said fluid, means controlling the temperature of said fluid by the temperature of the water being heated and thermostatically controlled means varying the quantity of said fluid contained in said chamber.

6. In combination with a water heater; a chamber containing liquid and a gaseous fluid, a fuel supply line adapted to be opened and closed by the varying height of said liquid, the height of said liquid being controlled by the quantity and temperature of said fluid, means controlling the temperature of said fluid by the temperature of the water being heated and means for varying the quantity of said fluid contained in said chamber by the temperature of the water being heated.

7. In combination with a water heater; a chamber containing liquid and a gaseous fluid, a fuel supply line adapted to be opened and closed by the varying height of said liquid, the height of said liquid being controlled by the quantity and temperature of said fluid, means controlling the temperature of said fluid and means regulating the quantity of said fluid contained in said chamber according to the temperature to which it is desired to heat the water.

In testimony whereof I affix my signature in presence of two witnesses.

ROBERT T. PARISEN.

Witnesses:
 ALEX. S. MABON,
 J. M. NESBIT.